Patented Dec. 7, 1937

2,101,558

UNITED STATES PATENT OFFICE 2,101,558

PROCESSING OF HYDROCARBON RESINS

Thomas F. Nealon, Boston, Mass., assignor to Monsanto Chemical Company, St. Louis, Mo., a corporation of Delaware No Drawing. Application July 8, 1936, Serial No. 89,662

6 Claims. (Cl. 260—2)

This invention relates to synthetic resins produced from cracked petroleum distillates, and it has as its object the provision of an improved method of refining synthetic resins produced by the action of acid reacting polymerizing agents, such as aluminum chloride on cracked petroleum distillates.

In the production of resins from highly cracked petroleum distillates containing appreciable proportions of olefins, diolefins, aromatic hydrocarbons, alkylated aromatic hydrocarbons, et al., as described, for example, in U. S. Patent 1,836,- 629; 2,039,264; 2,023,495, et al., the hydrocarbons are polymerized with an acid reacting condensing or polymerizing agent which agent must subsequently be removed. Complete removal is best effected by means of bases that destroy the acidity of the catalytic agent. However, it has been observed that the resins resulting from the processes heretofore described may vary in properties, especially color and resistance to weathering. I have now discovered that much of this variation can be attributed to the conditions and method of removing the catalyst and the freedom of the product from impurities and chemicals used in its manufacture and isolation. Thus, different methods of removing the metallic halide catalyst produce resins of variable colors and weathering characteristics.

According to the present invention the acid polymerizing agent is first destroyed completely by means of a solution of caustic alkali, and preferably in the presence of a hydrolytic agent which is soluble in the hydrocarbon mixture, such as alcohol. Thereafter the mixture is acidified to remove free alkali, insoluble material being removed by filtration, preferably before acidification. Finally the acidified filtrate is treated with a slight excess of a base that is insoluble in the hydrocarbon and forms salts with the free acid present that are likewise insoluble in the hydocarbon. By distilling the resulting mixture until the water and alcohol are eliminated certain impurities separate which are eliminated by a second filtration whereupon the filtrate is evaporated to recover the solid resin product. If desired, the resin may be subjected to additional decolorizing steps while still in solution, but in general this is unnecessary for most purposes.

The first filtrate containing the resin is alkaline; the extent of the alkalinity is dependent upon the excess alkali added. This excess alkalinity is acidified with an acid, preferably a dilute solution of sulfuric acid to make the solution slightly, but definitely acidic. Acids other than sulfuric may be used, including phosphoric, phthalic, etc. Acids whose alkali metal salts are insoluble in hydrocarbon solvents may be used.

Solid sodium carbonate, potassium carbonate or calcium carbonate is then added in an amount sufficient to neutralize all traces of acid and still leave a small amount in suspension in the solution. The mixture is then heated to distill off all low-boiling substances including water and the residual solid sodium carbonate and the salts formed as a result of these neutralization procedures may be removed completely in the second filtering operation.

Instead of adding solid carbonate to the entire batch and filtering subsequently, the batch can be acidified as before and passed through a layer of carbonate contained in a filtering tank or between the leaves of a filter press.

By way of example, the following operations describe in detail the improved process:

A water free, highly cracked distillate boiling below 200° C. with a specific gravity of 0.813 at 20° C., rich in diolefins and olefins is polymerized substantially as described in the patents referred to above with 1.5% by weight of anhydrous aluminum chloride, over a period of three hours. To this batch is then added a 26% alcoholic solution of sodium hydroxide prepared by dissolving 780 grams of sodium hydroxide in 750 cc. of water and then diluting with one liter of 95% ethyl alcohol, one liter of synthetic methyl alcohol and sufficient additional water to make three liters, the quantity of this solution added being about 110% of that required to combine with the aluminum chloride to form the hydroxide. The resulting mixture is filtered with the aid of positive pressure if necessary and the residue may be washed with petroleum naphtha to recover occluded soluble resin. A 17% aqueous solution of sulfuric acid is then added to the clear filtrate until it is definitely acid to litmus, whereupon solid sodium carbonate is added until a definite excess is present. The mixture is then evaporated or distilled until the boiling point of the condensate is about 120° C. The still fraction or still residue is then filtered to remove solids after which the filtrate which contains the resin is evaporated further in the customary manner to the extent desired.

The resins so produced are generally more uniformly light in color and of satisfactory melting point. The varnishes produced from these improved resins deposit uniform films which exhibit satisfactory resistance to water, and dilute alkaline and acid solutions. In general, the removal of the acid polymerizing agent may be effected with any hydrolytic medium. I prefer to use alcoholic sodium hydroxide (or, if desired, alcoholic ammonia solution) which is added in excess (for example, 5 to 12%) of that theoretically required for complete precipitation of the alumina. With this excess the character of the precipitated substances is such that subsequent filtration and washing operations are tremendously facilitated: whereas in substantially neutral solutions the precipitates are slimy in character, those formed in slightly alkaline solutions appear to be grainy and crystalline.

It is to be understood that inasmuch as the hereinabove description contains preferred embodiments of the invention, modifications and substitutions can be made therein without departing from the spirit of the invention, which is defined in the appended claims.

What I claim is:

1. In the manufacture of hydrocarbon resins by polymerization of a cracked hydrocarbon distillate rich in unsaturates including diolefines, by means of a metallic halide polymerizing catalyst, the steps in the recovery of the resin characterized in that the catalyst is neutralized and thereby destroyed by means of an excess of caustic alkali, after which the mixture is acidified by the addition of an acid whose alkali metal salt is insoluble in the hydrocarbon mixture and subsequently removing the excess acid by the addition of alkali metal carbonate.

2. The method as defined in claim 1 and further characterized in that the caustic alkali treatment is conducted in the presence of a water soluble alcohol having hydrolytic properties, and further characterized in that the reaction mixture is filtered after addition of the caustic alkali and before neutralization of the excess thereof.

3. The method as defined in claim 1 and further characterized in that the reaction mixture containing the carbonate is distilled to remove any water or alcohol and subsequently is filtered after which the resin is recovered from the filtrate by evaporating any remaining hydrocarbon solvent.

4. The method as defined in claim 1 and further characterized in that the caustic alkali is added as an aqueous alcohol solution in an amount equivalent to aproximately 110% of that required to decompose the acid catalyst present, and further characterized in that aqueous sulfuric acid is used to acidify the reaction mixture and sodium carbonate is used in excess to neutralize the acidified resin solution to which the sulfuric acid has been added.

5. In the manufacture of hydrocarbon resins by polymerization of a cracked hydrocarbon distillate rich in unsaturates including diolefins, by means of a metallic halide polymerizing catalyst, the steps in the recovery of the resin characterized in that the catalyst is neutralized and thereby destroyed by means of an excess of caustic alkali, after which the mixture is acidified by the adidtion of an acid whose alkali metal salt is insoluble in the hydrocarbon reaction mixture and subsequently removing the excess acid by the addition of a solid carbonate capable of neutralizing said acid.

6. In the manufacture of hydrocarbon resins by polymerization of a cracked hydrocarbon distillate rich in unsaturated hydrocarbons including diolefins, by means of an aluminumchloride catalyst the method for the recovery of the resin characterized in that the catalyst is neutralized and thereby destroyed by addition of an excess of aqueous caustic alkali solution to the reaction mixture, the precipitated solids are removed by filtration, after which the filtrate is acidified by the addition of sulfuric acid, the excess acid is then removed by the addition of solid dry sodium carbonate, the mixture is heated to expel water and then filtered to remove excess sodium carbonate and precipitated salts, and the resin is recovered from the filtrate by evaporation.

THOMAS F. NEALON.